(12) United States Patent
Bischoff

(10) Patent No.: US 9,179,599 B2
(45) Date of Patent: Nov. 10, 2015

(54) METHOD AND ARRANGEMENT FOR OPTIMIZING AN OPERATING PARAMETER OF A COMBINE

(71) Applicant: Deere & Company, Moline, IL (US)

(72) Inventor: Lutz Bischoff, Nuenshweiler (DE)

(73) Assignee: DEERE & COMPANY, Moline, IL (US)

( * ) Notice: Subject to any disclaimer, the term of this patent is extended or adjusted under 35 U.S.C. 154(b) by 48 days.

(21) Appl. No.: 14/096,175

(22) Filed: Dec. 4, 2013

(65) Prior Publication Data

US 2014/0171161 A1   Jun. 19, 2014

(30) Foreign Application Priority Data

Dec. 17, 2012   (DE) .......................... 10 2012 223 434

(51) Int. Cl.
  *A01D 69/00*   (2006.01)
  *A01D 41/127*   (2006.01)
(52) U.S. Cl.
  CPC .................................... *A01D 41/127* (2013.01)
(58) Field of Classification Search
  CPC ...... A01B 63/00; A01B 79/00; A01B 79/005; A01D 41/12; A01D 41/127; A01D 41/00; A01D 75/18; G07C 5/008; G07C 5/0808
  USPC ..... 56/10.2 R, 10.2 A–10.2 J; 701/33.7, 34.1, 701/50; 460/1, 105, 106
  See application file for complete search history.

(56) References Cited

U.S. PATENT DOCUMENTS

| | | | | |
|---|---|---|---|---|
| 4,376,298 | A | * | 3/1983 | Sokol et al. ..................... 701/50 |
| 5,978,720 | A | * | 11/1999 | Hieronymus et al. ........ 701/31.4 |
| 6,430,903 | B1 | * | 8/2002 | Christiansen et al. ...... 56/10.2 J |
| 6,726,559 | B2 | * | 4/2004 | Bischoff ........................... 460/1 |
| 8,600,627 | B2 | * | 12/2013 | Beck et al. ...................... 701/50 |

FOREIGN PATENT DOCUMENTS

| | | |
|---|---|---|
| DE | 4035470 C2 | 5/2000 |
| DE | 10062114 C2 | 4/2003 |
| EP | 1371278 A2 | 12/2003 |
| EP | 1243173 A1 | 8/2005 |
| EP | 1736044 A1 | 9/2008 |
| EP | 1207733 A1 | 8/2011 |

* cited by examiner

*Primary Examiner* — Robert Pezzuto

(57) ABSTRACT

A method and device for optimizing a parameter of a combine harvester by driving the combine harvester over a field an approximately constant speed or constant throughput; determining and storing data pertaining to at least one sensor value for a parameter of the processing procedure and to the associated position of the combine harvester in a processing unit; transmitting the position data to a manual apparatus provided with a camera and with a position determination device; moving the manual apparatus to the position, and recording an image of the field ground with a camera; processing the image in order to determine a property of the image; determining a calibration value by the processing unit using the sensor value and the property; and displaying and/or automatic setting of an operating value of the combine harvester by the processing unit using current sensor values and the calibration value.

10 Claims, 4 Drawing Sheets

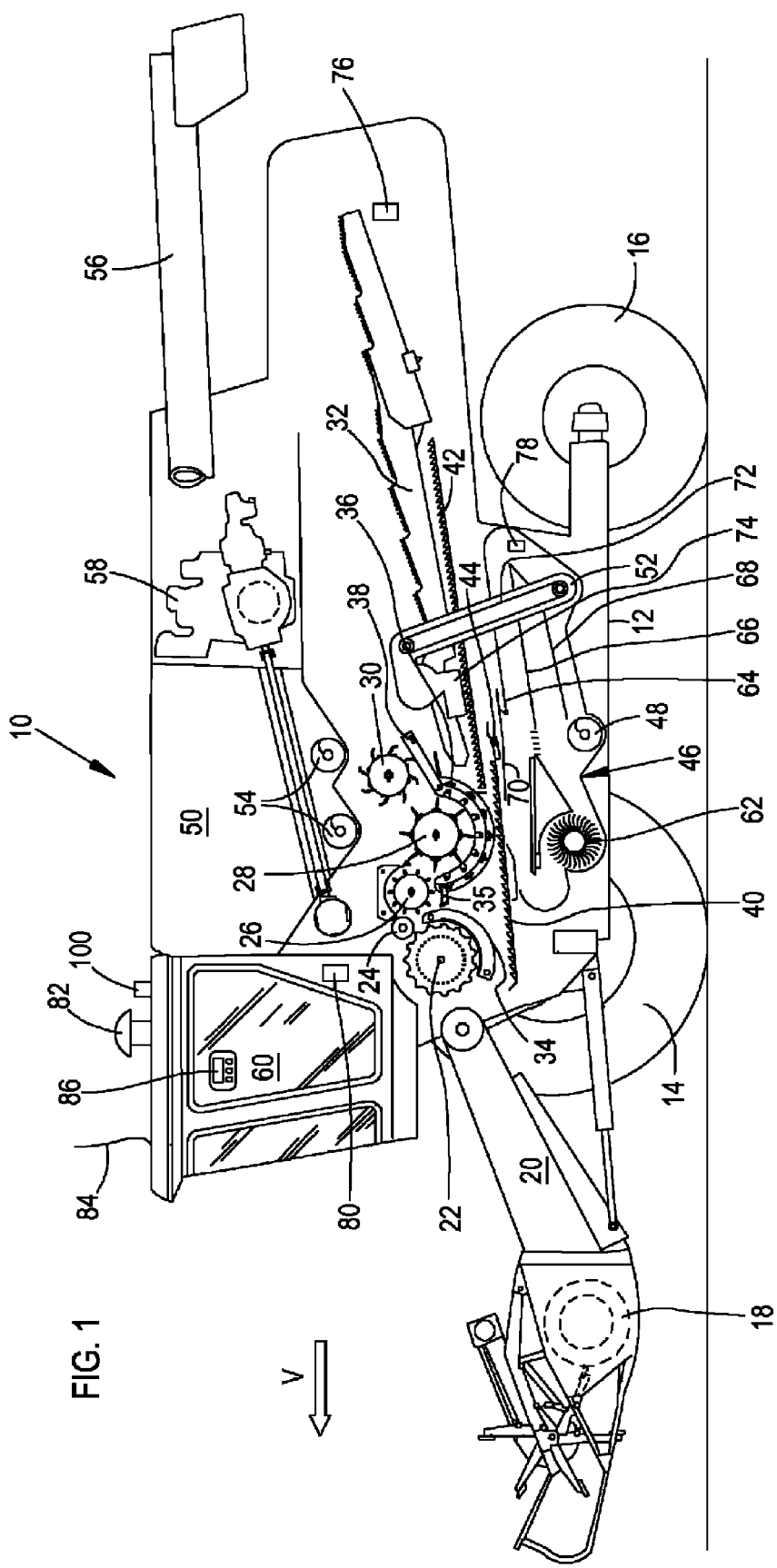

METHOD AND ARRANGEMENT FOR OPTIMIZING AN OPERATING PARAMETER OF A COMBINE

FIELD OF THE INVENTION

The invention pertains to a method and to an arrangement for optimizing an operating parameter of a combine harvester.

BACKGROUND

Combine harvesters are used in agriculture to harvest core-containing fruit, such as wheat or corn, from a field. During the harvesting operation, the plants are cut off or gathered. By means of a threshing device and a separation device, the grains are separated from the remaining harvested crop residues (in particular straw). A cleaning device then separates the grains from smaller harvested crop residues, such as straw fragments and chaff. Finally, the grains are placed in intermediate storage in a grain tank and transferred to a transport vehicle.

In a combine harvester, various operating parameters have to be specified by the operator, such as the rate of advance, the settings of the threshing device (rpm, threshing gap), and settings of the cleaning device (blower rpm, sieve opening size). The rate of advance defines the harvested crop throughput through the combine harvester, which, on the one hand, should not be excessively small in order to use the capacity of the combine harvester as well as possible, and, on the other hand, it should however also not be excessively large, because then the losses (which as a rule depend exponentially on the throughput), i.e., the quantity of grains released onto the field with the harvested material residue by the combine harvester at the rear side increase excessively. For the setting of the rate of advance, the operator usually uses grain loss sensors that are arranged for the detection of the lost grains downstream of the cleaning device and of the separation device. Such grain loss sensors as a rule comprise impact plates, on which oscillations are generated at the time of the impact of the loss grains, which are detected by an oscillation sensor and are verified by means of an electronic verification system and used by the operator for controlling a display device. For this purpose, reference is made to the disclosure of DE 40 35 470 C2.

The usual grain loss sensors, however, have the disadvantage that they have to be calibrated regularly in order to be able to display sufficiently precise values, because the lost grains generate different oscillations of the impact plates under different environmental conditions, such as, temperature and humidity. In addition, only a small proportion of the lost grains in fact reaches the grain loss sensors. The remaining lost grains are embedded in the straw or chaff. If the harvest conditions change, the proportion of grains that reach the grain loss sensor changes. Thus, the generated oscillations also depend on the harvest crop type and also on the respective throughput.

Thus, in the prior art, the operator of the combine harvester performs the following steps in order to calibrate the grain loss sensors: He moves the combine harvester at a certain constant speed over the field, until the processing procedure within the combine harvester has stabilized. Then, the loss value displayed on the display device is recorded or stored, and a test tray (see patent publications DE10062114 C2 and EP 1736044 A1) is released, after which the combine harvester is stopped, and the driver descends from his/her workplace in order to count the grains contained in the test tray. In many cases, this process occurs also without [a] test tray, and the operator counts the grains lying within a certain area of the ground. The number of lost grains is then entered into a separate computer in order to determine the losses as percentages relative to the throughput, or in order to read said percentages from a table on the basis of the counted lost grains. These relative losses are then used for the calibration of the grain loss sensor. As a rule, this procedure has to be carried out repeatedly until a speed has been found at which a reasonable compromise between throughput performance and acceptable losses is obtained. Finally, the combine harvester is moved manually or automatically at a speed corresponding to the determined loss value (or the throughput associated with said value, see EP 1243173 A1), so that, in the case of dense crops, the speed of advance can be slower and faster in the case of non-dense crops.

Similar processes also have to be carried out for the threshing assembly settings and the cleaning settings, for which automation has already been proposed (EP 1297733 A1, EP 1371278 A2), wherein the operator enters his/her estimate of the process result at different operating parameters into an on-board computer and on the basis of this, an automatic optimization of the process occurs.

The above-described calibration process for the grain loss sensors has to be repeated several times daily, which turns out to be quite time consuming and therefore, in numerous cases, the process is carried out only rarely or not at all. Thus, the combine harvester does not always work with optimal operating parameters, resulting either in high losses or in its capacity not being used optimally.

The problem that is the basis of the invention involves indicating a procedure that is improved compared to the prior art, for optimizing an operating parameter of a combine harvester, and a corresponding arrangement.

SUMMARY OF THE INVENTION

A method according to the invention for optimizing an operating parameter of a combine harvester comprises the following steps:
(a) the combine harvester is driven at an at least approximately constant speed and/or constant throughput over a field, at least until a processing procedure of the combine harvester has stabilized;
(b) data pertaining to at least one sensor value for a parameter of the processing procedure in the combine harvester and to the associated position of the combine harvester are determined and stored in a processing unit;
(c) the data pertaining to the position are transferred to a manual apparatus provided with a camera and with a position determination device;
(d) the manual apparatus is moved into position, and an image of the field ground is recorded with the camera;
(e) the recorded image is processed in order to determine a property of the image;
(f) using the sensor value and the determined property, a calibration value is determined by the processing unit;
(g) and an operating value of the combine harvester is calculated by the processing unit using current sensor values and the calibration value, and displayed and/or automatically set.

Accordingly, data are stored on the position of the combine harvester at which it advances (automatically or by an appropriate control of an operator) at constant speed or at constant throughput over a field, and at which the processing procedure in the combine harvester has stabilized. A processing unit also stores at least one sensor value for a parameter of the processing procedure in the combine harvester. The mentioned position data are transmitted by wireless means, in particular by a mobile radio connection or a wireless local network or via a Bluetooth connection or via a portable memory card, to a portable manual apparatus with a position determination device and a camera, wherein the apparatus can be in particular a so-called smart phone or a tablet computer. Then, a person, who may be the operator of the combine harvester or an assistant, goes to the stored position displayed on the manual apparatus and takes a picture of the field ground using the camera. This image is processed in order to determine the property of the image, which is subsequently used by the processing unit of the combine harvester in order to determine by means of the stored sensor value and the property a calibration value. This calibration value represents a relationship between the sensor value—determined in step (b)—for a parameter of the processing procedure in the combine harvester and a parameter determined in step (e). The calibration value can be, for example, a ratio (or a curve, table, equation) between the losses determined with a lost grain sensor and the losses actually determined on the field ground.

In the subsequent harvesting operation of the combine harvester, the calibration value obtained is finally used for the purpose of automatically setting, on the basis of the current sensor values, an operating value of the combine harvester, or for the purpose of displaying the operating value for information or manual setting by the operator. The current sensor value is then corrected in step (g) using the calibration value or is converted to a more precise value by calculation. This more precise value is used for the determination of the operating value or it is already the operating value. This operating value can be a value of the combine harvester, for example, the speed or throughput, which can be set during operation, or it can be a value representing a result of operation of the combine harvester, for example, the losses. Thus, using a method according to the invention and the calibration values that were determined, an operating parameter of the combine harvester can be optimized. This operating parameter can be the manually or automatically set operating value of the combine harvester. Alternatively or additionally, the operator has a more precise display of the value for the result of operation of the combine harvester, on the basis of which he/she can now control a settable operating parameter (in particular a speed or throughput) of the combine harvester based on more precise information and thus also more precisely.

Due to the use of the manual apparatus, the process of acquisition of the image and the derivation of the property are considerably simplified in comparison to the prior art, because the person is guided by the position determination system and an appropriate display of the manual apparatus, without problems and in an error-free manner, to the correct location for taking a picture of the field. In addition, the determination of the sought property is at least partially automated and simplified, and the manual counting of grains on the field ground or in a test tray can be dispensed with.

Steps (a) and (b), on the one hand, and steps (c)-(f), on the other hand, are preferably each repeated at different speeds and/or throughputs. In the process, it is advantageous to carry out first steps (a) and (b) several times one after the other at different speeds that as a rule increase successively. It is only following said steps that steps (c)-(f) for several positions occur, wherein steps (c) and (f) in each case can occur nearly simultaneously for several positions. Finally, the processing unit of the combine harvester has calibration values available to it, which can be used for the generation of a calibration curve in order to be able to carry out step (g) with sufficient precision even for sensor values located between the data points.

The sensor value thus relates in particular to grain losses and/or to the throughput of the combine harvester. The required property of the image is then preferably the number of lost grains on a certain area of the field. However, it would also be conceivable for the sensor value to relate to a setting of a threshing device of the combine harvester, for example, the threshing gap or the threshing drum rpm, and the property of the image is the broken grain ratio.

Step (e) can take place in the manual apparatus or in the processing unit. If it occurs in the manual apparatus, the determined property is transmitted by wireless means or via a transportable memory card from the manual apparatus to the processing unit. Analogously, the image recorded by the camera is sent by wireless means from the manual apparatus to the processing unit, if step (e) takes place there. Step (e) can take place completely independently by means of an image processing system or taking into consideration operating inputs, wherein, in the last-mentioned case, for example, an operator can mark relevant image portions (i.e., lost grains) on a touch-sensitive display of the manual apparatus or of the processing unit. The number of markings is then determined by a processor of the manual apparatus or of the processing unit.

In step (g), the measured values of an additional sensor can be taken into account for the determination of an environmental variable and learned, or predetermined effects of the environmental variable on the sensor values can be taken into account as well. Thus, for example, the environmental temperature and the air humidity can be determined. The processing unit has information available to it that has been learned by it over the course of time when the procedure according to the present invention is used, or information that has been stored in memory at the factory, said information indicating the effects that this/these environmental variable(s) has or have on the parameters determined by the sensor. Thus, for example, grains become softer at higher air humidity than in dry air, leading to the grains causing softer impact signals on the impact plate of a lost grain sensor. These data are used in step (g) for correcting the respective measured values of the sensor, wherein, in step (f) and/or (g), the measured values of the additional sensor, which predominate in the implementation of step (b), can also be taken into consideration. Similarly, in step (g), other operating values of the combine harvester that influence the sensor values can be taken into consideration.

The mentioned taking into consideration of the effect of the determined environmental conditions and/or operating values of the combine harvester when evaluating the sensor value for the parameter of the processing procedure can naturally also be used independently of the calibration of steps (a)-(g), for example, by having the processing unit in step (g) use a relationship between the current and corrected sensor values, which has been obtained in another manner, or (in the case of the omission of steps (a)-(f)), permanently stored, and by having the corrected sensor values be compensated using the determined environmental conditions and/or operating values of the combine harvester. The characteristics of Claims 7-9 are inventions that are of independent inventive rank, and they can be the subject matter of a partial application.

An inventive arrangement for optimizing an operating parameter of a combine harvester includes a combine harvester, which comprises a sensor for determining a parameter of the processing procedure in the combine harvester, a position determination device for determining the position of the combine harvester, a processing unit connected to the sensor and to the position determination device, as well as a transmission and receiving device. In addition, this arrangement also includes a manual apparatus, which comprises a transmission and receiving device, a position determination device, and a camera. The combine harvester and the manual apparatus are configured for carrying out the above-described method.

BRIEF DESCRIPTION OF THE DRAWINGS

FIG. 1 is a diagrammatic side view of a combine harvester.

DETAILED DESCRIPTION

Figure 3:
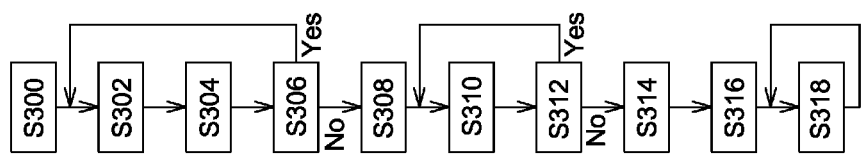
FIG. 3 is a flowchart by which the grain loss sensors of the combine harvester are calibrated.
Figure 2:
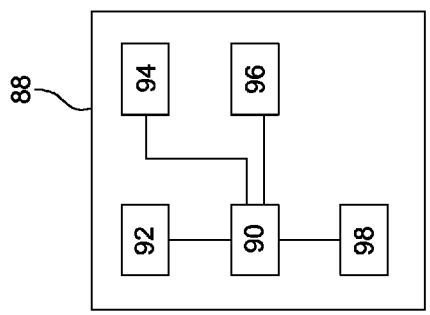
FIG. 2 is a diagrammatic view of a manual apparatus.

FIG. 1 shows a self-driven combine harvester 10 with a frame 12, which is supported on the ground by driven front wheels 14 and steerable rear wheels 16 and advanced by said wheels. The wheels 14 are driven in rotation by means of a drive means that is not shown, in order to move the combine harvester 10, for example, over a field to be harvested. Below, the direction information, such as, at the front and at the rear, refers to the driving direction V of the combine harvester 10 in the harvesting operation.

In the front end area of the combine harvester 10, a harvest material recovery device 18 in the form of a cutting assembly is connected in a detachable manner, in order to harvest during the harvesting operation the harvested crop in the form of wheat or other cereals that can be threshed from the field, and return it upwards and downwards through a conveyor 20 of an inclined endless belt type to a multi-drum threshing assembly, which includes (arranged sequentially one after the other in the driving direction V) a threshing drum 22, a stripping drum 24, a conveyor drum 26 of an overshot type, a tangential separator 28 as well as a deflection drum 30. Downstream of the deflection drum 30, a straw shaker 32 is located. The threshing drum 22 is surrounded in its lower and rear area by a threshing basket 34. Beneath the conveyor drum 26, a cover 35 provided with openings or closed is arranged, while above the conveyor drum 26, a fixed cover is located, and beneath a tangential separator 28, a separation basket 36 with adjustable finger elements is located. Beneath the deflection drum 30, a finger rake 38 is arranged.

Beneath the multi-drum threshing assembly, a front conveyor bottom 40 is located, which during operation carries out an oscillating movement directed alternately toward the front and toward the rear. A rear conveyor bottom 42 is arranged beneath the straw shaker 32, and during operation it carries out an oscillation movement that is also directed alternately toward the rear and toward the front. The front conveyor bottom 40 transports the mixture of grain and chaff toward the rear, mixture that passes through the threshing basket 34 and through the tangential separator 28 downward, while the rear conveyor bottom 42 transports the mixture of grain and chaff toward the front, mixture that flows through the straw shaker 32. The rear conveyor bottom 42 transfers its mixture at its front end to the front conveyor bottom 40, which in turn passes it through a rearward finger rake 44 downward. The mixture delivered by the front conveyor bottom 40 then reaches a front sieve 70 and from the front sieve 70 it reaches a top sieve 64 of a cleaning device 46.

The cleaning device 46 comprises a blower 62, which delivers an air stream to the top sieve 64 and to a bottom sieve 66 from below. The grain that falls through the bottom sieve 66 downward is supplied by a conveyor bottom 68 to a grain auger 48, which moves the grain to an elevator (not shown) that transports it to a grain tank 50. A returns auger 52 combines the return consisting substantially of incompletely threshed spike portions, which falls downward at the rear end of the bottom sieve 66, and delivers it to a returns elevator 72, which supplies it to a secondary thresher 74.

The chaff delivered at the rear end of the top sieve 64 can be expelled on the back side of the sieve device by a rotating chaff distributor, or it is discharged through a straw chopper (not included in the drawing) arranged downstream of the straw shaker 32. The cleaned wheat can be unloaded from the grain tank 50 by an unloading system with cross augers 54 and an unloading conveyor belt 56.

The mentioned systems are operated by means of a combustion engine 58 and they are controlled and steered by an operator from a driver cabin 60. The various devices for threshing, conveying, cleaning and separating are located within the frame 12. Outside the frame 12, an outer sheath that can be folded up for the most part is located.

The multi-drum threshing unit represented here is only an example of one embodiment. It could also be replaced by a single transversely arranged threshing drum and a downstream separation device with a straw shaker or with one or more separating rotors. However, it is also conceivable to use a rotating axial cutting-off device, which comprises a threshing section and a separating section. It is possible to use a single axial cutting-off device or two (or more) adjacently arranged axial cutting-off devices.

Beneath the rearward end of the straw shaker 32, a first grain loss sensor 76 is arranged, which includes an impact plate and an oscillation sensor as well as evaluation electronics connected therewith. The grain loss sensor 76 is used for the detection of lost grains that are deposited at the end of the straw shaker 32 on the field. Said grains cause noises as they hit the impact plate that are detected by the oscillation sensor and recognized by the evaluation electronic system. A second grain loss sensor 78 is connected at the rearward end of the cleaning device 46 and it is of identical or similar design compared to the first grain loss sensor 76. The second grain loss sensor 78 detects lost grains that are discharged at the end of the cleaning device 46 on the field.

The grain loss sensors 76, 78 are connected to a processing unit 80 used as on-board computer, which is also connected to a position determination device 82 in the form of an antenna and a receiving and evaluation device for receiving signals of a satellite-based position determination system that is optionally improved in terms of its precision by local reference stations (GPS, Galileo, Glonass, and similar devices), to a transmission and receiving device 84 for radio waves with an antenna, and to an operator input interface 86 with a display unit.

Moreover, to implement the procedure according to the invention, a manual apparatus 88 (of the portable type) is provided, which the operator can hold with one hand or two hands, and which comprises a processor unit 90, a display 92 of the touch-sensitive type connected to the processor unit 90, a position determination device 94 that is connected to the processor unit 90 and in the form of an antenna and a receiving and evaluation device for receiving signals of a satellite-based position determination system that is optionally improved in terms of its precision by local reference stations (GPS, Galileo, Glonass, and similar devices), a camera 96 of the electronic digital type connected to the processor unit 90 as well as a transmission and receiving device 98 for radio waves, which is connected to the processor unit 90, with an antenna. Such manual apparati 88 are available as so-called smart phones or tablet computers. However, they can also be an apparatus that has been constructed especially for the present application case. The software for the processor unit 90 can be downloaded as a so-called app from the Internet.

FIG. 3 shows a flowchart according to which an inventive calibration of the grain loss sensors 76, 78 of the combine harvester 10 occurs. The method of FIG. 3 is preferably carried out at the beginning of the harvest operation, and it can be repeated a single time or several times during the day. After the start in step S300, step S302 follows, in which the combine harvester 10 is driven at an at least approximately constant speed and/or constant throughput over a field to be harvested, and the harvested crop is taken up and processed in the combine harvester 10. Here, the speed can be specified by the operator in the driver cabin 60 by means of a driving lever. If the crops are sufficiently homogeneous, then the throughput through the combine harvester is also nearly constant. The possibility also exists to determine the throughput by means of a sensor that determines, for example, the layer height in the conveyor 20 or the drive/torque of the threshing drum 22, and to automatically regulate by means of the processing unit 80 the rate of advance of the combine harvester 10 to a constant throughput, as an adjustment pump in the hydraulic drive of the wheels 14 is adjusted electromechanically. This step S302 is run at least until a processing procedure of the combine harvester has stabilized, i.e., the material quantities processed in the threshing and separating device as well as in the cleaning device 46 are temporally sufficiently constant. The combine harvester 10 is thus exposed to a certain throughput. This throughput as a rule is measured with the described sensors and recorded in order to be able to determine relative grain losses.

Next, step S304 follows, in which data are determined and stored in the processing unit 80, said data pertaining to at least one sensor value for a parameter of the processing procedure in the combine harvester 10 and the associated position of the combine harvester 10. These sensor values are loss values supplied by the grain loss sensors 76, 78. In addition, the throughput of the combine harvester 10, which has been discussed in regard to step S302, can be stored. The data on position are made available by the position determination device 82. In step S304, at least one sensor value is thus associated with a stored position and stored, a sensor value that was obtained at the stored position.

In the following step S306, a query occurs to determine whether the steps S302 and S304 should be repeated at another speed. If this is the case, steps S302 and S304 are repeated again, but, at another rate of advance, and thus another throughput of the combine harvester 10. Otherwise the next step is S308, in which data for all the positions stored in the previous executions of step S304 are transmitted from the processing unit 80 in a wireless manner via the transmission and receiving device 84 and its antenna and via the transmission and receiving device 98 of the manual apparatus 88 to the processor unit 90 of the manual apparatus 88. Here, any protocol can be used, either a Bluetooth or WLAN protocol, or a telephone connection based on the GSM or UMTS standard, in particular with insertion of a transmission and receiving station of a telecommunications company.

In step S310, on the display 92 of the manual apparatus 88, a first position contained in step S308 is then displayed, where a photograph of the field ground is to be taken with the camera 96. For this purpose, a map can be displayed on which the instantaneous position of the manual apparatus 88, which is made available by the position determination device 94, and the position to be taken are displayed. In a simpler embodiment, only one arrow can be displayed on the display, which displays to the operator (which in this case is the driver of the combine harvester 10 or an assistant) of the manual apparatus 88 indications showing in which direction he/she must move in order to reach the desired position. When the position has been reached, a confirmation is displayed, and the operator is required to align the camera 96 at this location on the field ground and to press a trigger button. The triggering can occur automatically by an inclination sensor, which detects a manual apparatus 88 that is sufficiently horizontally held. In addition, the triggering can be blocked as long as the desired position has not yet been reached. Subsequently, the processor unit 90 of the manual apparatus 88 is provided by the camera 96 with image data on the desired position, which can be stored in a position-referenced manner.

In step S312, a query is issued to determine whether images at other positions still have to be recorded. If this is the case, step S310 for the next position occurs again; otherwise step S314 occurs.

In step S314, the image processed in step S310 is processed in order to determine a property of the image. This property is the number of lost grains on a predetermined area of the field. The step S310 can be carried out automatically by an image processing system of the processing unit 80, for the purpose of which the image data (position-referenced) are transmitted analogously to step S308 by the processor unit 90 of the manual apparatus 88 via the transmission and receiving device 98 of the manual apparatus 88 and the combine harvester-side transmission and receiving device 84 and their antenna to the processing unit 80. It would also be conceivable to transmit the image to another stationary computer, which transmits its result to the processing unit 80. In another embodiment, step S314 occurs in the manual apparatus 88, by displaying the received image on the display 92, and having the operator, with a stylus or a similar device, mark the lost grains contained in the image on the display 92. For simplifying and avoiding duplicate entries and lost grains that have not been acquired, marked lost grains can be displayed with a color background on the displayed image by the processor unit 90. When the marking has been completed, the number of lost grains is transmitted in a position-referenced manner by the path described in this section to the processing unit 80. If step S310 has been executed several times, step S312 is also carried out separately for each image, either directly after each step S310 or only after the step S310 has been executed for the last time.

In step S314, one must ensure that a defined area on the ground is evaluated in order to determine the number of lost grains per unit area. For this purpose, a recording scale can be determined, for example, by having the distance between the camera 96 and the field ground be taken from an autofocusing system of the camera 96 by the processing unit 80 or the processor unit 90, and using the distance jointly with the respectively used focal distance of the lens of the camera 96 for the mentioned purpose, or, for this purpose, a characteristic in the recorded image (for example, a certain object of known dimension, such as a cube, or similar) is included in the photograph and evaluated. The number of lost grains per unit area can then be normalized relative to the harvest (grains present in the crop per unit area, which is measured in particular by means of the throughput sensor) in order to determine the relative losses. The present invention can also be combined with a test tray measurement by photographing the amount of grains in a test tray released by the combine harvester in step 304 by means of the camera 96, and by determining the amount by the processing unit 80 or the processor unit 90. If the camera 96 does not work, the person can count the grain loss number at the site to be evaluated of the field if needed, and manually enter said number in the manual apparatus 88.

Figure 4:
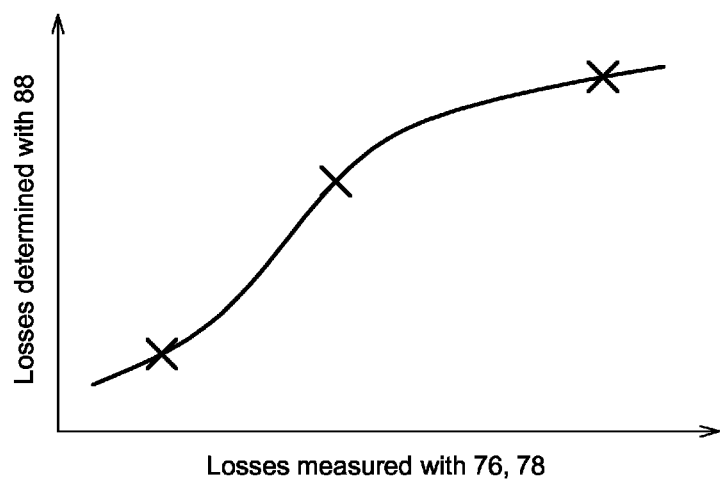
FIG. 4 is a calibration curve for the grain loss sensors, which can be generated by the procedure shown in FIG. 3.
Figure 5:
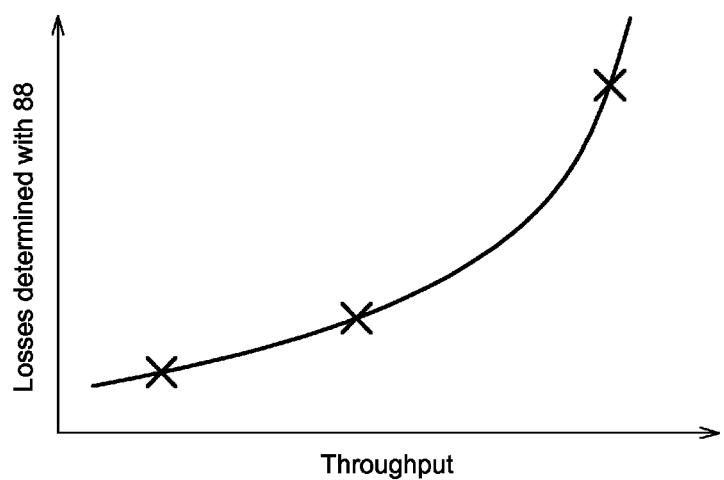
FIG. 5 is a calibration curve showing the relationship between losses measured in the field and throughput.
Figure 6:
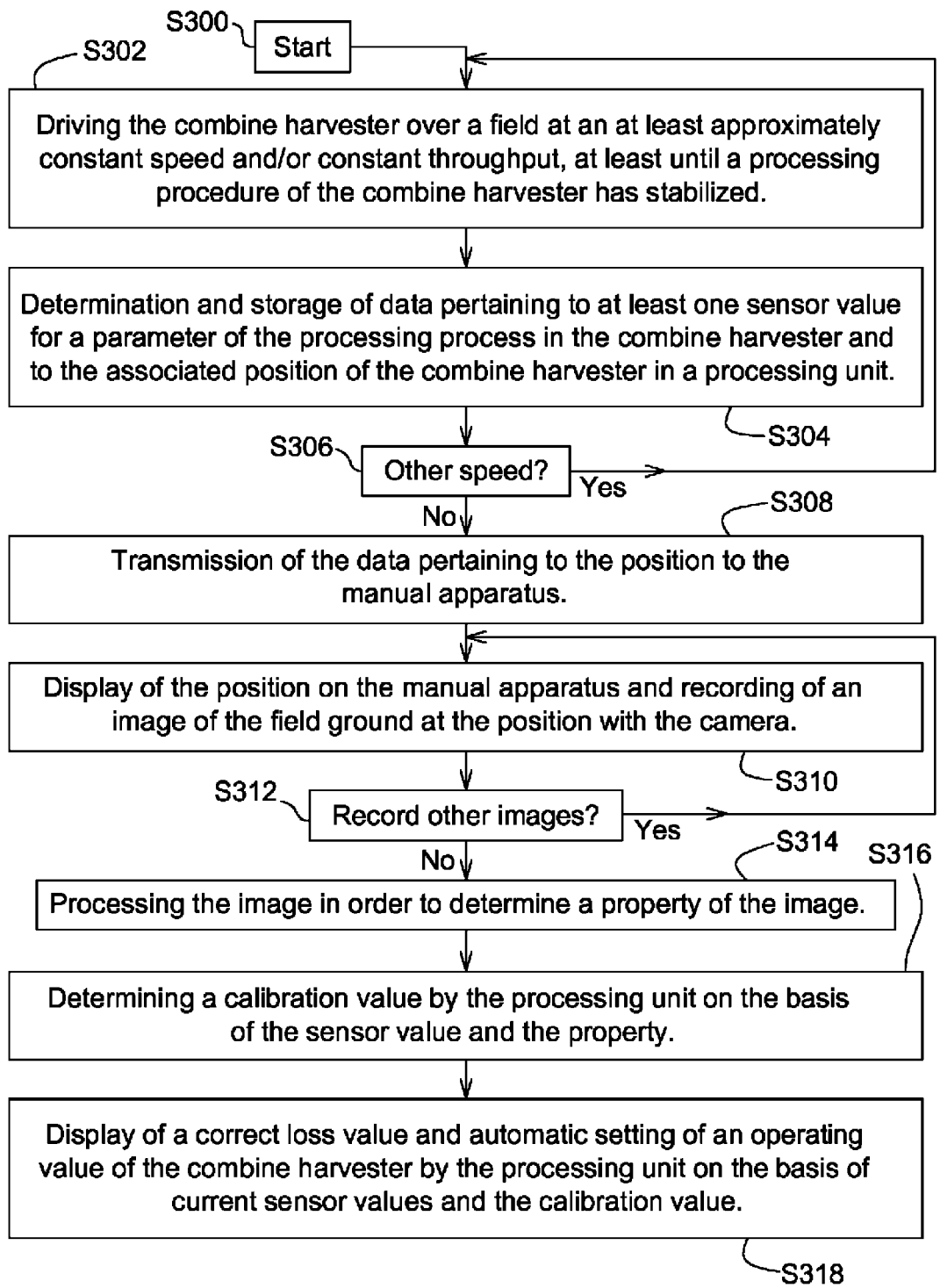
FIG. 6 is a flow chart showing a method for optimizing an operating parameter of a combine harvester utilizing the present invention.

In the following step S316, information is now available to the processor unit 90 regarding the values of the loss sensors 76, 78 and the associated number of lost grains per unit area as well as optionally regarding the associated throughput. The number of lost grains per unit area is advantageously converted using the measured throughput to a relative loss value expressed with respect to the (weight or volume) throughput, which can be indicated as a percentage. For this purpose, as a rule, the cutting width of the harvest material recovery device 18 of the combine harvester 10 is taken into consideration. In this manner, one obtains one or more measurement points, as shown in FIG. 4, in which, on the X axis, the losses recorded by the grain loss sensors 76, 78 and on the Y axis, the losses determined by the manual apparatus 88 are displayed using crosses. In step S316, using the sensor value (grain loss sensors 76, 78) and the property (lost grains in the image), a calibration value is generated, which, in particular, can be a calibration curve, as shown in FIG. 4. The possibility also exists to set up a similar curve that contains on the X axis the measured throughput and on the Y axis the losses determined with the manual apparatus 88, as displayed in FIG. 5.

In step S316, the grain weight (thousand grain weight) of the respective harvest material type can be taken into consideration in addition, in order to determine the number of grains taking into consideration the weight-based yield, which can be converted by a throughput sensor to a relative grain loss portion (measured as a percentage). This thousand grain weight can be obtained for the respective harvested crop type from a table stored in the manual apparatus 88, wherein the selection by the operator can be made with the help of the grain size indicated in the photograph recorded with the camera 96, in comparison to a template in which different grain sizes are reproduced on the display 92. However, the possibility also exists to derive the thousand grain weight directly by means of the processing unit 80 or the processor unit 90, from the image produced by the camera 96.

The calibration curve of FIG. 4 is then used in step S318 in the further operation of the combine harvester 10 for the purpose of first calculating, using the at this time currently determined values of the loss sensors 76, 78, a correct (calibrated) operating value of the combine harvester, namely the loss value, and then displaying it on the display unit of the operator interface 86.

In addition, the correct loss value for the automatic setting of an operating value of the combine harvester 10 can be used particularly in order to specify the rate of advance in such a manner that a desired loss value can be maintained. For this purpose, either the losses determined with the grain loss sensors 76, 78 can be corrected on the basis of the curve of FIG. 4, and compared to a target value in order to adjust the rate of advance automatically, or the calibration curve according to FIG. 5 can be used in order to specify the throughput or the rate of advance in such a manner that a desired loss value is maintained.

It should be noted that different changes and refinements of the procedure of FIG. 3 are possible. Thus, in step S318, the measured values of an additional sensor for the acquisition of an environmental variable (for example, air humidity sensor 100 for the determination of the relative or absolute humidity of the environmental air) and learned or specified effects of the environmental variable on the sensor value can be taken into consideration. Here, the measured values of the additional sensor that are present in step S304 can be taken into consideration. Thereby, the precision of the calibration process is further improved.

Moreover, the possibility exists of determining by sensor means, in steps S304 and S318, additional values influencing the determination of the sensor value for the parameter of the processing procedure in the combine harvester 10 (i.e., the grain loss sensors 76, 78), and of storing them by means of the processing unit 80. These values are then taken into account for compensation in step S316 and/or S318 taking into consideration the instantaneously determined corresponding values. For this purpose, in the operation of the combine harvester 10, learned or permanently stored relationships between these values and the sensor values can be used. The mentioned values concern particularly the inclination of the combine harvester 10 in the forward and/or side direction, the work parameters of the cleaning device 46, the flow rates of the grain and/or chaff, the grain moisture and/or the conveyance rate of non-grain components in an elevator between the grain auger 48 and the grain tank 50. The ratio between grain and straw has an important effect on the measurement results of the grain loss sensors 76, 78. Thus, the grain throughput, for example, in the elevator, can be measured between the grain auger 48 and the grain tank 50, and the layer thickness determined in the conveyor 20, or a drive moment determined in the threshing assembly represents the straw throughput. In the measurements, the two quantities determined in measuring the grain and straw throughput should be as constant as possible. Using the ratio between grain and straw throughput measured in step S304 and in step S318, the precision of the measured loss value can be improved.

The invention claimed is:

1. A method for optimizing an operating parameter of a combine harvester (10) comprising these steps:
    (a) driving the combine harvester (10) over a field at at least an approximately constant speed or constant throughput, at least until a processing procedure of the combine harvester (10) has stabilized;
    (b) determining and storing in a processing unit (80) data pertaining to at least one sensor value for a parameter of the processing procedure in the combine harvester (10) provided by a first sensor (76, 78), and data pertaining to an associated position of the combine harvester (10);
    (c) transmitting the data pertaining to the associated position to a manual apparatus (88), wherein said manual apparatus is provided with a camera (96) and with a position determination device (94);
    (d) moving the manual apparatus (88) to the associated position, and recording an image of a field ground with the camera (96);
    (e) processing the image in order to determine a property of the image;
    (f) determining a calibration value by the processing unit (80) using the at least one sensor value and the property of the image; and
    (g) determining and then displaying or automatically setting an operating value of the combine harvester (10) by the processing unit (80) using current sensor values of the first sensor (76, 78) and the calibration value.

2. The method according to claim 1, wherein the steps (a) to (f) are each repeated at different speeds or different throughputs.

3. The method according to claim 1, wherein the at least one sensor value relates to grain losses or throughput of the combine harvester (10), and the property of the image is a number of lost grains on a certain area of the field.

4. The method according to claim 1, wherein step (e) occurs in the manual apparatus (88) or in the processing unit (80).

5. The method according to claim 1, wherein step (e) occurs completely automatically or taking into consideration operator inputs.

6. The method according to claim 5, wherein, in step (e), an operator can mark relevant image portions of the image on a touch-sensitive display (92) of the manual apparatus or of the processing unit, and a number of markings is counted.

7. The method according to claim 1, wherein, in step (g), measured values of an additional sensor (100) are taken into consideration for a determination of environmental variables, and learned or predetermined effects of an environmental variable on the sensor values are taken into consideration.

8. The method according to claim 1, wherein, in steps (b) and (g), additional values that influence a determination of the at least one sensor value for the parameter of the processing procedure in the combine harvester (10) are determined by additional sensor means and stored, and wherein these additional values are taken into consideration in step (f) or (g) in a compensating manner for the data pertaining to at least one sensor value, considering values provided by the additional sensor means at a later time, wherein permanently stored relationships or relationships learned during operation of the combine are taken into consideration.

9. The method according to claim 8, wherein the additional values relate to an inclination of the combine harvester (10) in the forward direction or lateral direction, to work parameters of a cleaning device (46), to flow rates of grain or chaff, to grain moisture or to a conveyance rate of non-grain components in an elevator between a grain auger (48) and a grain tank (50).

10. A combine harvester (10) comprising means for performing the steps of claim 1.

* * * * *